Nov. 24, 1959 J. T. CRONKHITE 2,914,083
COMBINATION AUTOMATIC SHUTOFF AND CHECK VALVE
Filed March 8, 1957 2 Sheets-Sheet 1
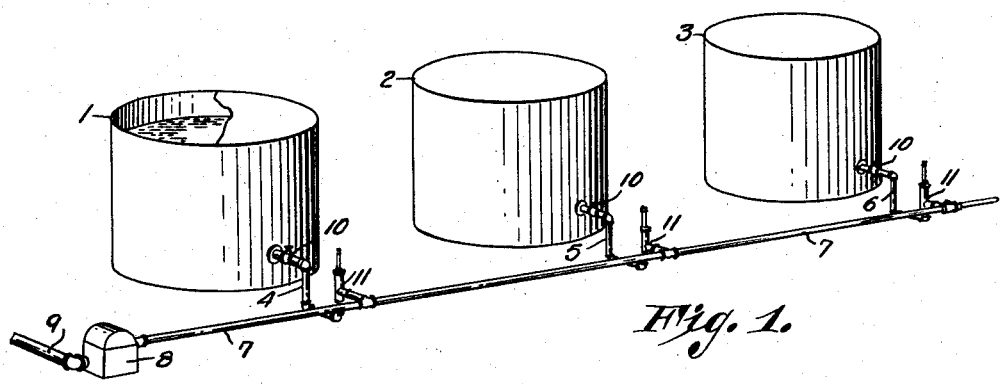
Fig. 1.
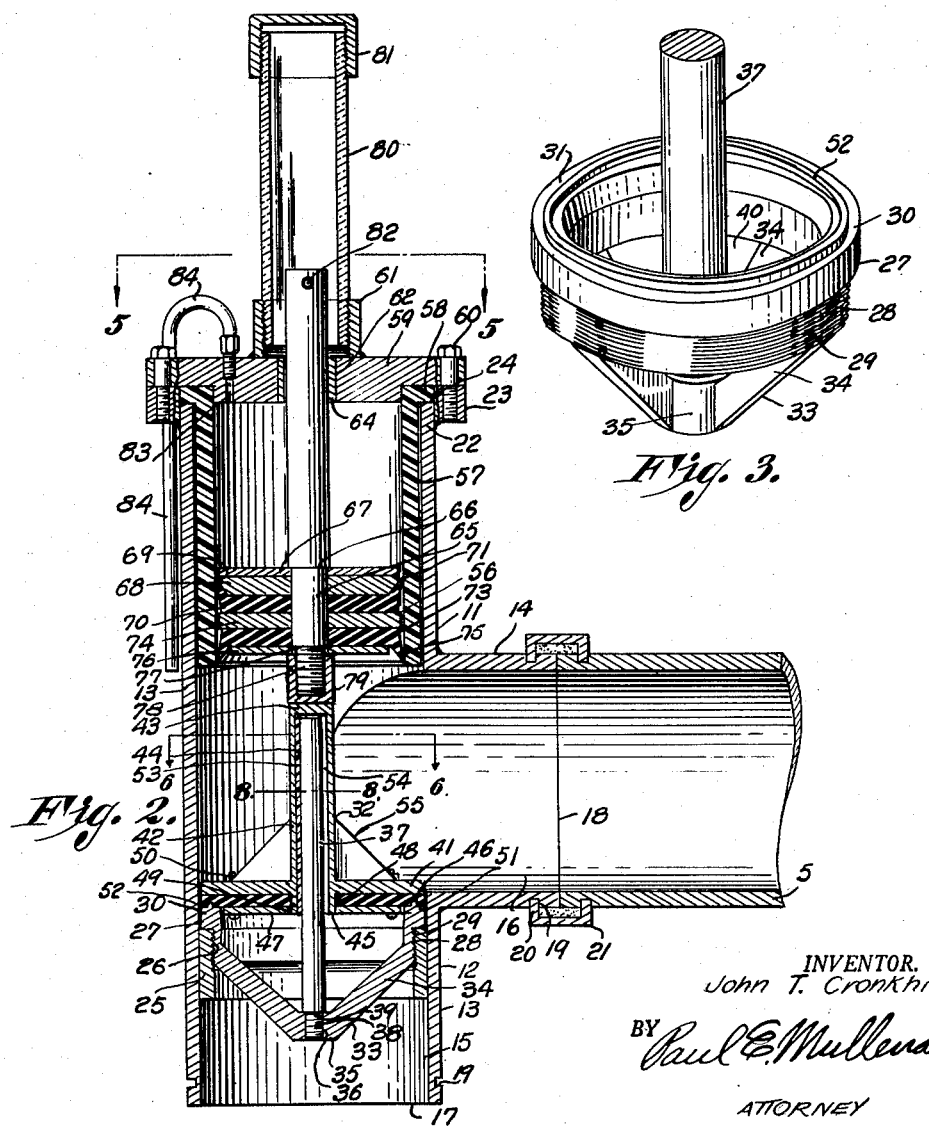
Fig. 2.
Fig. 3.
INVENTOR.
John T. Cronkhite
BY Paul E. Mullendore
ATTORNEY Nov. 24, 1959  J. T. CRONKHITE  2,914,083
COMBINATION AUTOMATIC SHUTOFF AND CHECK VALVE
Filed March 8, 1957  2 Sheets-Sheet 2
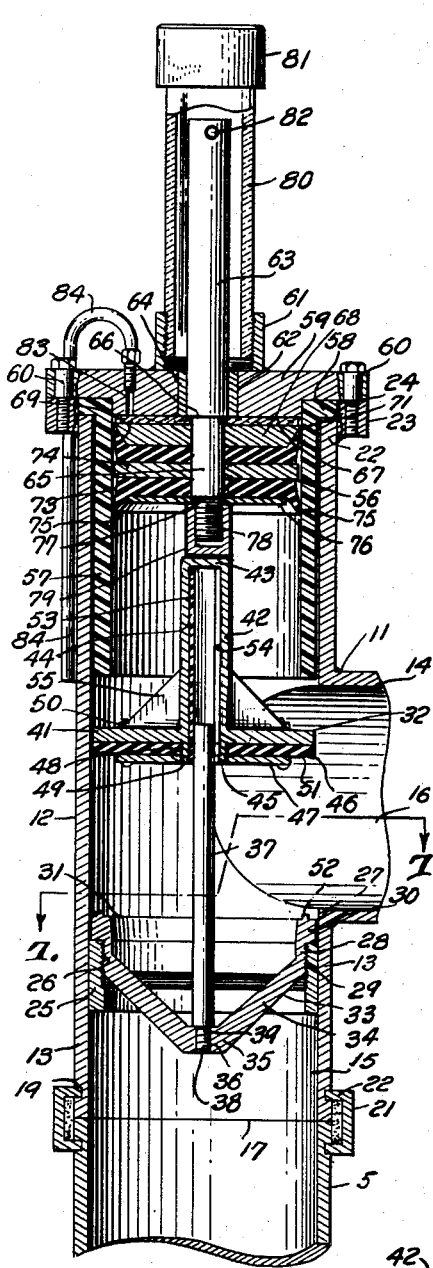
Fig. 1.
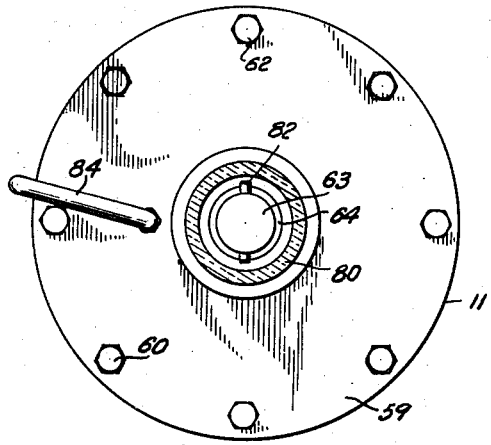
Fig. 5.
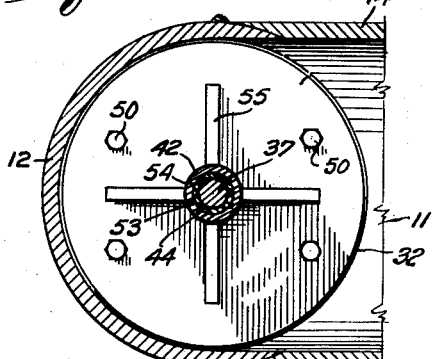
Fig. 6.
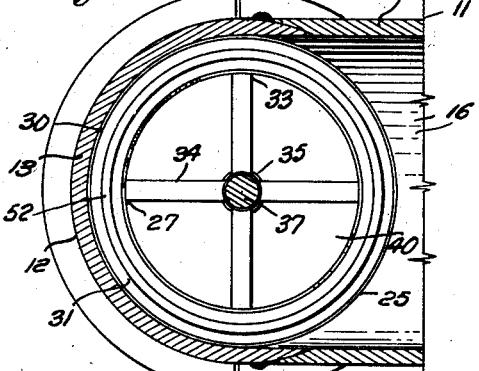
Fig. 7.
Fig. 4.
Fig. 8.
INVENTOR.
John T. Cronkhite
BY Paul E. Mullendore
ATTORNEY

United States Patent Office 2,914,083
Patented Nov. 24, 1959

2,914,083
COMBINATION AUTOMATIC SHUTOFF AND CHECK VALVE

John T. Cronkhite, Tulsa, Okla.

Application March 8, 1957, Serial No. 644,846

4 Claims. (Cl. 137—496)

This invention relates to a combination automatic shutoff and check valve, and has for its principal object to provide a valve of this character which operates effectively under corrosive conditions.

For example, petroleum fluids are discharged from the well into a plurality of field or gauging tanks, wherein liquid components of the flow are stored preparatory to discharge to market through a system of gathering lines leading to a main pipe line. Each tank of a battery of tanks is usually connected by a branch line with a common gathering line, from which the liquid is pumped into the pipe line. Each branch line is normally equipped with a manually operable shutoff valve which remains closed while the tank is being filled and until the gauger of a purchasing company samples the liquid and gauges the contents of the tank. The shutoff valve is then opened and the liquid flows to the inlet of the pump, which operates to discharge the liquid under pressure into and through the pipe line. Such an arrangement requires attention of the gauger so that the valve may be closed as soon as the tank is empty, otherwise air is drawn through the tank and into the pump. If the valve is not shut off at the proper time, the air seriously interferes with flow of liquid from other tanks of the battery, and the air, on reaching the pump, interferes with the pumping action on the liquid. Another difficulty is that if one or more of the tanks is located at a higher level, the liquid petroleum will backflow into an empty tank, with the result that the volume of liquid which has been gauged in the higher tanks may not reach the pipe line in the proper way.

Various automatic valves have been developed for automatically shutting off flow, and some of these valves are also designed to serve as check valves, but they have not proved completely satisfactory because they are affected by the corrosive action of well fluids and cannot be depended upon for completely automatic operation.

Further objects of the invention are to provide a combination shutoff and check valve wherein the moving parts which move in contact with other parts are not subject to corrosion which ordinarily interferes with the positive and sensitive action necessary to make such values reliable; to provide the valve with a piston responsive to suction of the pump for seating of the valving element when the level of the liquid on the tank side of the valve drops to the point where air is likely to be drawn through the valve; to provide a removable and non-corrosive cylinder for the piston; to provide a valve structure wherein the valving element is adapted to seat automatically independent of movement of the piston for action as a check valve, and to provide means for guiding the valving element to and from seated position and wherein the movable parts of the guide are not affected by the corrosive characteristics of the liquid.

It is also an object of the invention to provide a valve of the type described that is of simple and relatively inexpensive construction, in that the valve body and the pipe line connections therefor are formed of the same materials and joined together in the manner as the pipes which they interconnect.

It is also an object of the invention to provide means to indicate visibly the position of the valving element within the valve body.

Another object of the invention is to provide means for venting the piston cylinder and which is adapted to be automatically sealed by a part of the piston when the valving element is in unseated position.

In accomplishing these and other objects of the invention, improved structure has been provided, the preferred form of which is illustrated in the accompanying drawings, wherein:

Fig. 1 is a perspective view of a battery of tanks, each having a branch line connected with a gathering line through a combination shutoff and check valve embodying the features of the present invention.

Fig. 2 is a vertical section through the valve showing the valving element in seated position and the piston in position for holding the valving element seated when a tank to which the valve is connected is substantially empty.

Fig. 3 is a perspective view of the valve seat and guide stem for the valving element.

Fig. 4 is a section similar to Fig. 2, but showing the valving element unseated and the piston in retracted position for establishing flow through the valve.

Fig. 5 is a cross section on the line 5—5 of Fig. 2.
Fig. 6 is a cross section on the line 6—6 of Fig. 2.
Fig. 7 is a cross section on the line 7—7 of Fig. 4.
Fig. 8 is an enlarged cross section on the line 8—8 of Fig. 2.

Referring more in detail to the drawings:

1, 2 and 3 designate field or gauge tanks for containing and storing the liquid petroleum produced from one or more wells (not shown). Any number of tanks may be provided in a battery of tanks to take care of the liquid production, after one or more of the tanks have been filled and awaiting sampling and/or gauging prior to discharge through branch pipes 4, 5 and 6 leading to a common gathering line 7 which connects with one or more pumps, indicated at 8, for discharging the liquid under pressure into a transportation pipe line 9. Each of the branch lines 4, 5 and 6 is provided with a manually operable stop valve 10 for holding the liquid in the tank until it is ready to be discharged to the gathering line 7. After the liquid in the tanks which have been filled is sampled and gauged, the valves 10 for those tanks are opened and left open until the liquid has been discharged from the tanks. Usually the gathering line is connected with other batteries of tanks, and the pumps 8 remain in operation. Therefore, when the tanks become empty, it is necessary to close the valves 10 to prevent the pumps from drawing air from the empty tanks into the gathering and pipe lines, which air would interfere with flow of the liquid from other batteries of tanks connected to the gathering line 7, and any air discharged into the transportation line 9 by the pumps would interfere with movement of the liquid to market. In addition to this difficulty, if any of the other batteries of tanks connected with the gathering line 7 are located at a higher elevation, liquid therefrom will tend to backflow through the branch connections 4, 5 or 6 of the empty tanks.

To avoid these difficulties, each of the branch pipes 4, 5 and 6 is provided with an automatic combination shutoff and check valve 11, in addition to the stop valves 10, so as to automatically shut off flow in the branch pipes when the tanks connected therewith are empty. Also, since the valves 11 are automatic, they must be immediately responsive, positive in operation, and not affected by corrosive action of the liquid.

In carrying out the invention, each valve 11 includes a casing 12 having a main or vertical body portion 13 and lateral branch portion 14. The body portion 13 and branch portion 14 are preferably sections of pipe which conform in material and size with the piping that composes the branch pipes 4, 5 and 6 and of the gathering pipe 7, to facilitate welding of the parts of the casing thereto or connection thereof by any of the usual couplings.

In forming the casing, a section of pipe is cut to form the desired length of the body portion 13, after which a side wall portion thereof is cut away for connection with the branch portion 14. The branch portion 14 is also cut from a section of the pipe, and one end thereof is shaped to conform with the cylindrical wall of the body portion 13, so that it may be welded thereto to form a one-piece valve casing having an inlet 15 at one end and an outlet 16 provided by the branch portion 14. The ends 17 and 18 of the valve casing may be welded directly to the pipes which the valve connects, or they may be provided with threads, flanges, or other means of connection, as desired. In the illustrated instance, the ends 17 and 18 are provided with annular grooves 19 to accommodate flanges 20 of a clamp type of coupling ring 21. Fixed to the opposite end 22 of the cylindrical body portion 13 is an annular ring 23, which in the illustrated instance is sleeved over the end 22 and secured thereto by welding. The ring 23 projects from the end 22 to provide an inset annular shoulder 24, for a purpose later described. Inset within the inlet end of the casing is a sleeve 25 having interior threads 26. The inner end of the sleeve 25 terminates short of the lateral portion 14 to accommodate a valve seat member 27.

The valve seat member 27 is best illustrated in Fig. 3, and includes an annular ring shaped body portion 28 having exterior threads 29 adapted to engage the interior threads 26 of the inset sleeve 25. The ring shaped body portion 28 also includes an annular outwardly extending flange 30 for engaging the end of the sleeve 25 when the valve seat is threaded thereinto. The flange 30 is of suitable size to provide an annular seat 31 slightly inset with respect to the branch 4 for seating a valving member 32. The seat member 27 also includes a spider portion 33 having downwardly converging arms 34 joining coaxially of the seat 31 in a cylindrical boss 35, the boss 35 being provided with an interiorly threaded axial opening 36 for anchoring a guide stem or pin 37 for the valving member 32.

The guide stem 37 is preferably of cylindrical cross section and has a reduced exteriorly threaded terminal 38 to engage in the interiorly threaded opening 36 and to provide a shoulder 39 for seating on the boss 35. The guide stem 37 is thus supported by the seat member 27 and extends coaxially through the body portion 28 thereof to terminate slightly below the opposite diametrical side of the branch portion 14. The arms 34 of the spider portion 33 are spaced apart to provide openings 40 therebetween for the flow of liquid from the inlet 15 of the valve casing to the outlet 16 thereof.

The valving member 32 includes a disk shaped head 41 having a tubular stem 42 projecting from the inner side thereof and which is of sufficient length to provide an enclosure for the guide stem 37 when the valving member 32 is in seated position. The end of the tubular stem 42 is closed by a wall 43 to provide a flat-faced abutment. The bore 44 of the tubular stem extends through the head 41 and through a boss 45 on the opposite side of the head 41 to center a resilient disk 46 that forms a facing for the head 41 and which is retained thereagainst by a plate 47. The plate 47 and disk 46 have openings 48 and 49 to pass over the boss 45. The plate 47 is secured to the valve head 41 to clamp the resilient disk therebetween by fastening devices, such as bolts 50, as shown in Figs. 2, 4 and 6. The plate 47 is of smaller diameter than the inner diameter of the seating face 31 to expose the annular marginal face 51 of the resilient disk 46 to provide the valving face of the valving member. To facilitate a better seal between the seat and the valving element, the seating face 31 is preferably provided with an annular rib 52 adapted to indent in the resilient material of the valve face 51, as shown in Fig. 2. The tubular stem 42 of the valving member is of larger inner diameter than the exterior diameter of the guide stem 37 to accommodate a noncorrosive lining material 53 for contact with the guide stem on which the valving member 32 is movable. The lining 53 has longitudinal grooves 54 for venting the space between the end of the guide stem and the tubular stem of the valving member. The head 41 is preferably braced with respect to the tubular stem 42 by gussets 55.

The valving member 32 is adapted to open and close responsive to differences in pressure on the respective sides of the head thereof. When the tank is empty, the valving member is held on its seat by means of a piston 56 that is reciprocable within a cylindrical liner of sleeve member 57 contained within the vertical body portion 13 of the valve casing. The liner 57 is formed of non-corrosive material and slides freely into position within the body portion 13 to seat an annular flange 58 thereon against the interior shoulder 24. The liner is retained in place by a plate 59. The plate 59 is of a diameter corresponding to the outside diameter of the ring 23 and is secured thereto by cap screws 60, as shown in Figs. 2 and 4. The plate carries, on its outer side, an interiorly threaded collar 61, in encircling relation with an axial opening 62 in the plate for passing a vertical guide stem 63 of the piston 56. The opening 62 is preferably provided with a bushing 64 to provide bearing contact for the piston guide stem 63.

The piston guide stem 63 has an inner end extending into the liner 57 and has a reduced portion 65 on which the elements of the piston 56 are mounted. The reduced portion 65 also provides a shoulder 66 to seat the elements of the piston thereagainst.

The piston 56 is of composite construction and includes a resilient washer 67 seated against the shoulder 66 and which is followed by a disk or washer 68 having a beveled periphery 69 to seat within a resilient cup 70. The cup 70 has an annular lip 71 held in contact with the inner face of the cylindrical liner 57 by the bevel 69 of the disk 68. The piston 56 also includes a reversely arranged cup 73 that is separated from the cup 72 by a spacing washer 74. The cup 73 also has an outwardly flaring lip 75 that is held in contact with the cylindrical liner by a washer 76 which is seated against a shoulder 77 encircling an exteriorly threaded terminal 78 which mounts a clamping nut 79 for retaining the parts of the piston in assembly on the reduced portion 65 of the piston guide stem. The material composing the resilient cups is preferably placed under slight compression by properly spacing the shoulders 66 and 77 to give the desired effect. The nut 79 is in the form of a cap to completely enclose the threaded terminal 78 to form an abutment on the piston having a face corresponding to the flat abutment face on the closed end of the tubular stem portion 42 of the valving member 32, as best shown in Fig. 2.

The opposite end of the piston guide stem projects through the collar 61 so that it is visible through a transparent tubular housing 80 that is threaded into the collar 61. The tubular housing 80 is of ample length to accommodate the stem 63 of the piston 56 when the washer 67 of the piston is in stopped engagement with the inner side face of the head plate 59, as shown in Fig. 4. The outer end of the tubular housing 80 is closed by a cap 81 that is preferably threaded thereon. The upper end of the piston guide stem 63 is preferably provided with a transverse pin 82, so as to facilitate a hand hold for manual lifting of the piston within the cylindrical liner, if desired. This may be accomplished by unscrewing the transparent housing 80 from the collar 61.

In order to vent the space between the piston and plate 59, the plate 59 is provided with a port 83 that extends therethrough and is connected on the outer side by a vent tube 84 that is in the form of a gooseneck and has a terminal extending downwardly alongside of the valve body, as shown in Fig. 2. When the piston 56 is in its uppermost position and retained by the pressure of the liquid flowing through the valve casing, the washer 67 closes the vent port. In this way, the lips on the piston cups 72 and 73 may fit relatively loosely within the cylinder liner 57, and if any leakage should occur therebetween, the disk forms a seal to prevent leakage of the liquid through the vent port at the time liquid is flowing through the valve. The non-corrosive lining 53 and sleeve member 57 may be a plastic material, as is indicated by the section lining in Figs. 2 and 4 of the drawings.

Assuming that a valve is constructed, assembled as described, and installed in the branch lines which connect a battery of tanks with a gathering line 7, as shown in Fig. 1, the operation is as follows:

The manually operated valves 10 are closed during filling of the tanks and the valving elements 32 of the automatic valves 11 are closed.

When one or more of the tanks is filled and gauged, the gauger will open the manual valves 10 for those tanks, so that the hydrostatic pressure of the liquid is effective to lift the valving members 32 from the seat members of the automatic valves 11. This is effected by the head of the liquid in the tanks acting through the openings 40 of the spider portions 33 of the seat members on the under faces of the valving members. The spaces in the cylinders 57 above the pistons 56 are vented through the ports 83 to atmosphere, so that the hydrostatic pressure of the fluid in the tanks is sufficient to lift the valving members and pistons. The construction of the pistons provides a substantially resilient seal with the inner faces of the liners 57, so that the pistons offer a minimum of resistance to movement of the valving members. After the valving members are unseated, the velocity of the flow through the valve casing acts to hold the valves open during flow of the liquid. However, when a tank is emptied and the flow ceases through the seat member of the automatic valve for that tank, the valving member will drop by gravity into engagement with its seat member. Simultaneously, the piston for that valve follows the valving member responsive to suction of the pumps acting on the under sides of the pistons. With the suction pressure acting on the pistons and supplemented by weight of the moving parts, the valving members remain closed and prevent any possibility of air being drawn into the pipe lines by way of an emptied tank. The valving members also act as check valves to prevent any backflow of liquid into an empty tank, which is of special importance where the empty tank is located at a lower elevation than other of the tanks from which liquid is under flow into the gathering line. Attention is directed to the construction of the piston and valving member so that the abutments that are provided on the piston and on the valve stem constitute the sole points wherein the piston and valve member engage each other throughout their movement towards and away from the seat member.

The condition in the respective tanks may be readily noted at a distance by observing the position of the piston guide stems 61 of the automatic valves. If a guide stem is down in the transparent housing 80, it will indicate that the automatic valve for that tank has closed and that the tank is empty. The manual valve for the empty tank may then be closed and the tank refilled, while the contents of other of the tanks are discharged into the gathering line. If the piston guide stem appears in the upper end of the transparent housing 80, it will indicate that the liquid is still flowing from the tank to the gathering line.

Attention is directed to the construction whereby all of the moving parts are in relative contact by corrosion resistant surfaces and surfaces which provide for a minimum of friction. For example, the parts of the piston contact the inner surface of the corrosion resistant liner 57, and one of the relatively movable guide stems for the valve and seat elements is similarly provided with a corrosion resistant lining. Also, the heads of the valving elements carry resilient disks, which are also effective in maintaining a free acting seal for the valving elements so that they are at all times instantly responsive to the fluid pressure when the manual valves are opened.

It is obvious that the noncorrosive liner or sleeve 57 provides for guided support of the piston to retain the piston for free acting movement, and that the guide pin 37 and tubular stem 42 provide a separate and independent guide for the valving member. Consequently, there is no binding of the moving parts, and the only connection is that afforded by the abutment of the flat face at the closed end of the valve stem with the flat face of the nut 79. This is important, because the piston must be kept in circumferential sealing contact with the liner sleeve and the valving element must be kept in concentric relation with its seat. This structure also makes it possible to provide light sealing contact between the piston and liner, and permits the use of non-corrosive plastic surfaces on which the moving parts may glide.

From the foregoing, it is obvious that I have provided a combination automatic shutoff and check valve which is positive in action and which is not affected by corrosive fluids.

What I claim and desire to secure by Letters Patent is:

1. In a valve of the type which includes a casing having a vertical portion and a lateral portion providing a flow passageway through the casing from an inlet in the lower end of the vertical portion to an outlet in the lateral portion and divided below the outlet by a valve seat member and having a valving member for movement to and from the seat member to open and close flow through said passageway and having a piston reciprocable in the upper end of the vertical portion for seating the valving member when suction pressure exists in the outlet port and for opening and closing a vent port in the upper end of the vertical portion of the casing, wherein said valving member has a tubular stem projecting upwardly in the vertical portion of the casing on the outlet side thereof and having a bore opening upwardly through the valving member in coaxial relation therewith and closed at its upper end to provide a substantially flat-faced abutment, a guide pin extending into the bore of the tubular stem, means carried by the seat member for supporting the guide pin coaxially of the seat member and for guiding the valving member in coaxial relation with the seat member independently of the piston, an abutment on the piston having a face corresponding with the abutment face of the valve stem, said stem and piston abutments being the sole points wherein the piston and valve members engage each other throughout their movement towards and away from said seat member, and a sleeve member in the upper vertical portion of the casing providing a circumferential guide for the piston independently of the valving member whereby the valving member and piston are adapted to move to and from each other on their own axes when the abutment faces are brought together upon unseating of the valving member for shifting the piston upwardly in the cylinder to close the vent port and when the piston moves downwardly to seat the valving member responsive to suction in said outlet.

2. In a valve of the type which includes a casing having a vertical portion and a lateral portion providing a flow passageway through the casing from an inlet in the lower end of the vertical portion to an outlet in the lateral portion and divided below the outlet by a valve seat member and having a valving member for movement to and from the seat member to open and close flow through said passageway and having a piston reciprocable in the upper end of the vertical portion for seating the valving member when suction pressure exists in the outlet port and for opening and closing a vent port in the upper end of the vertical portion of the casing, wherein said valving member has a tubular stem projecting upwardly in the vertical portion of the casing on the outlet side thereof and having a bore opening upwardly through the valving member in coaxial relation therewith and closed at its upper end to provide a substantially flat-faced abutment, a guide pin extending into the bore of the tubular stem, a plastic liner in the bore providing a plastic guiding surface in contact with the guide pin, means carried by the seat member for supporting the guide pin coaxially of the seat member and for guiding the valving member in coaxial relation with the seat member independently of the piston, an abutment on the piston having a face corresponding with the abutment face of the valve stem, said stem and piston abutments being the sole points wherein the piston and valve members engage each other throughout their movement towards and away from said seat member, and a noncorrosive plastic sleeve member in the upper vertical portion of the casing providing a circumferential plastic guide surface for the piston independently of the valving member whereby the valving member and piston are adapted to move to and from each other on their own axes when the abutment faces are brought together upon unseating of the valving member for shifting the piston upwardly in the cylinder to close the vent port and when the piston moves downwardly to seat the valving member responsive to suction in said outlet.

3. In a valve of the type which includes a casing having a vertical portion and a lateral portion providing a flow passageway through the casing from an inlet in the lower end of the vertical portion to an outlet in the lateral portion and provided below the outlet by a valve seat member and having a valving member for movement to and from the seat member to open and close flow through said passageway and having a piston reciprocable in the upper end of the vertical portion for seating the valving member when suction pressure exists in the outlet port and for opening and closing a vent port in the upper end of the vertical portion of the casing, wherein the valving member has a tubular guide stem projecting upwardly in the vertical portion of the casing on the outlet side thereof and having a bore opening upwardly through the valving member in coaxial relation therewith and closed at its upper end to provide a substantially flat-faced abutment, a guide pin extending into the bore of the tubular stem, means carried by the seat member for supporting the guide pin coaxially of the seat member and for guiding the valving member in coaxial relation with the seat member independently of the piston and wherein the piston includes a vertical stem having a reduced portion provided with a threaded terminal on its lower end, oppositely facing cups on said reduced portion, washers supporting the cups therebetween, a resilient washer on the upper of said washers and having a portion for closing off the vent opening, a clamping nut on the threaded terminal and having a closed lower end providing an abutment face corresponding with the abutment face of the valve stem, said stem and piston abutments being the sole points wherein the piston and valve members engage each other throughout their movement towards and away from said seat member, and a sleeve member in the upper vertical portion of the casing providing a circumferential contact with the cups of the piston for guiding the piston independently of the valving member whereby the valving member and piston are adapted to move to and from each other on their own axes when the abutment faces are brought together upon unseating of the valving member for shifting the piston upwardly in the cylinder to close the vent port and when the piston moves downwardly to seat the valving member responsive to suction in said outlet.

4. In a valve of the type which includes a casing having a vertical portion and a lateral portion providing a flow passageway through the casing from an inlet in the lower end of the vertical portion to an outlet in the lateral portion and provided below the outlet by a valve seat member and having a valving member for movement to and from the seat member to open and close flow through said passageway and having a piston reciprocable in the upper end of the vertical portion for seating the valving member when suction pressure exists in the outlet port and for opening and closing a vent port in the upper end of the vertical portion of the casing, wherein the valving member has a tubular guide stem projecting upwardly in the vertical portion of the casing on the outlet side thereof and having a bore opening upwardly through the valving member in coaxial relation therewith and closed at its upper end to provide a substantially flat-faced abutment, a plastic liner in said bore for providing a plastic guiding surface in contact with the guide pin, a guide pin extending into the bore of the tubular stem, means carried by the seat member for supporting the guide pin coaxially of the seat member and for guiding the valving member in coaxial relation with the seat member independently of the piston and wherein the piston includes a vertical stem having a reduced portion provided with a threaded terminal on its lower end, oppositely facing cups on said reduced portion, washers supporting the cups therebetween, a resilient washer on the upper of said washers and having a portion for closing off the vent opening, a clamping nut on the threaded terminal and having a closed lower end providing an abutment face corresponding with the abutment face of the valve stem, said stem and piston abutments being the sole points wherein the piston and valve members engage each other throughout their movement towards and away from said seat member, and a noncorrosive sleeve member in the upper vertical portion of the casing providing a circumferential contact with the cups of the piston for guiding the piston independently of the valving member whereby the valving member and piston are adapted to move to and from each other on their own axes when the abutment faces are brought together upon unseating of the valving member for shifting the piston upwardly in the cylinder to close the vent port and when the piston moves downwardly to seat the valving member responsive to suction in said outlet.

References Cited in the file of this patent

UNITED STATES PATENTS

| | | |
|---|---|---|
| 1,621,858 | Sherwood | Mar. 27, 1927 |
| 1,962,740 | Jaworowski | June 12, 1934 |
| 1,998,056 | Naatz et al. | Apr. 16, 1935 |
| 2,216,296 | Raymond | Oct. 1, 1940 |
| 2,451,626 | Marshall | Oct. 19, 1948 |
| 2,591,174 | Martin | Apr. 1, 1952 |
| 2,663,600 | Newhall | Dec. 22, 1953 |
| 2,725,076 | Hansen | Nov. 29, 1955 |

FOREIGN PATENTS

| | | |
|---|---|---|
| 11,363 | Denmark | Oct. 19, 1908 |